(12) United States Patent
Rao et al.

(10) Patent No.: US 7,129,413 B1
(45) Date of Patent: Oct. 31, 2006

(54) UNIVERSAL OUTLET PLATE COVER ASSEMBLY

(76) Inventors: C. Gireesh Rao, 202-V Foliage Cir., Cary, NC (US) 27511; David L. Scheer, 6604 Viceroy Dr., Raleigh, NC (US) 27613; Ashok Sathyanarayana Alilughatta, D-703 Spring Field Society, Kothrud Pune (IN)

( * ) Notice: Subject to any disclaimer, the term of this patent is extended or adjusted under 35 U.S.C. 154(b) by 0 days.

(21) Appl. No.: 10/904,955

(22) Filed: Dec. 7, 2004

(51) Int. Cl.
*H02G 3/14* (2006.01)

(52) U.S. Cl. .......................... 174/66; 174/67; 220/241; 220/242

(58) Field of Classification Search .................. 174/53, 174/50, 58, 57, 48, 66, 67; 220/3.2, 3.3, 220/3.4, 3.5, 3.6, 3.7, 3.8, 3.9, 4.02, 241, 220/242; 248/906; D13/152, 156, 177; 439/536
See application file for complete search history.

(56) References Cited

U.S. PATENT DOCUMENTS

| 3,813,640 | A | | 5/1974 | Carissimi | 339/156 |
|---|---|---|---|---|---|
| 4,381,063 | A | | 4/1983 | Leong | 220/242 |
| 5,430,253 | A | * | 7/1995 | Pratt | 174/67 |
| 5,527,993 | A | * | 6/1996 | Shotey et al. | 174/67 |
| 5,763,831 | A | | 6/1998 | Shotey et al. | 174/67 |
| 5,779,083 | A | * | 7/1998 | Bordwell | 220/242 |
| D418,114 | S | | 12/1999 | Hayduke et al. | D13/156 |
| 6,028,268 | A | | 2/2000 | Stark et al. | 174/67 |
| 6,133,531 | A | | 10/2000 | Hayduke et al. | 174/67 |
| D460,421 | S | | 7/2002 | Marozsan, Jr. | D13/156 |
| 6,437,242 | B1 | | 8/2002 | Radosavljevic et al. | 174/67 |
| D486,452 | S | | 2/2004 | Dinh | D13/156 |
| 6,894,223 | B1 | * | 5/2005 | Shotey et al. | 174/67 |

* cited by examiner

*Primary Examiner*—Angel R. Estrada
(74) *Attorney, Agent, or Firm*—Mills Law Firm PLLC

(57) ABSTRACT

A weatherproof outlet plate cover assembly provides a weatherproof a universal lid that is diagonally hinged at a corner of the cover plate for unobstructed lateral and downward routing of electrical cables in either a horizontal of vertical location. The universal lid carries a sealing gasket that is spring biased against a projecting rim that circumscribes a center panel provided with a center opening(s) for use with either duplex or GFCI receptacles. The hinge design allows the use of one product in each formal for two applications—vertical plus horizontal mounting.

6 Claims, 7 Drawing Sheets

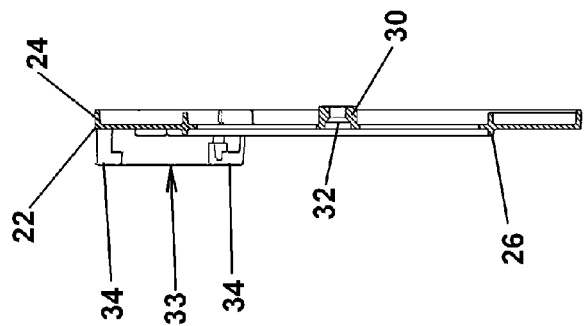
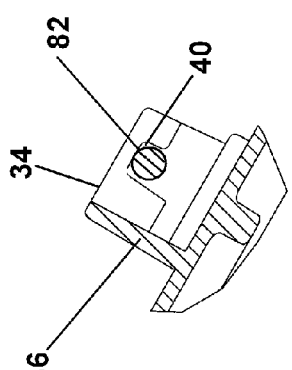
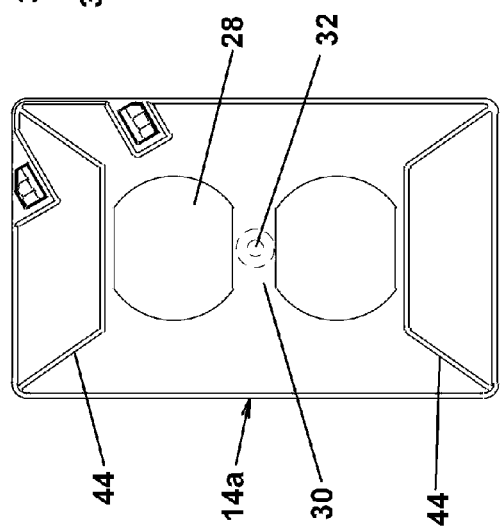
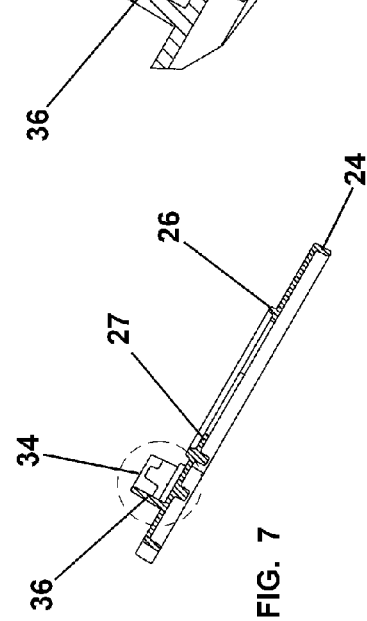
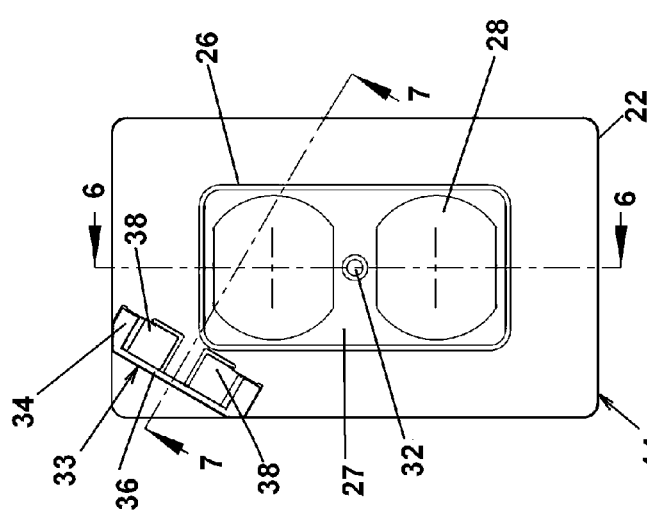

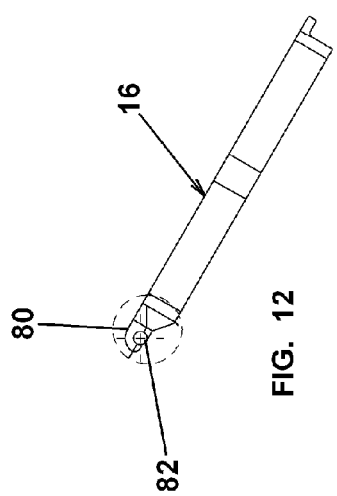
FIG. 13
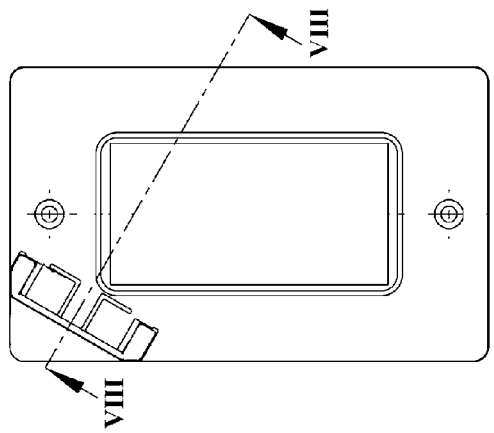
FIG. 9
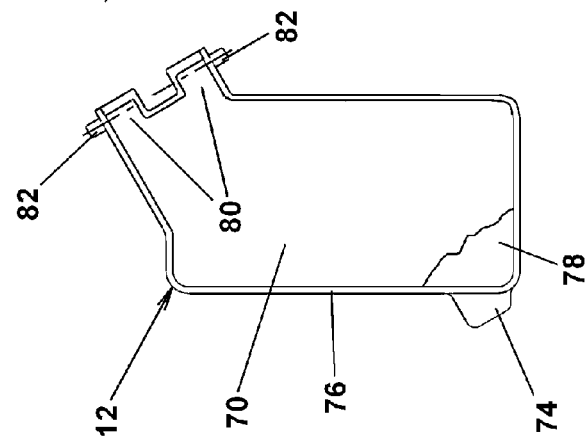
FIG. 11
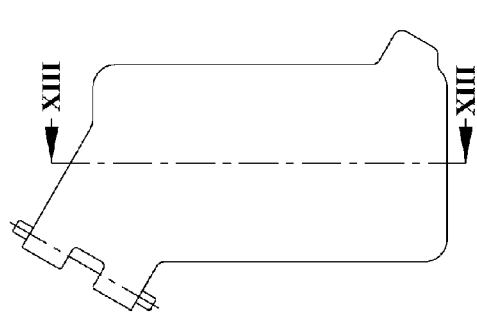
FIG. 12
FIG. 10

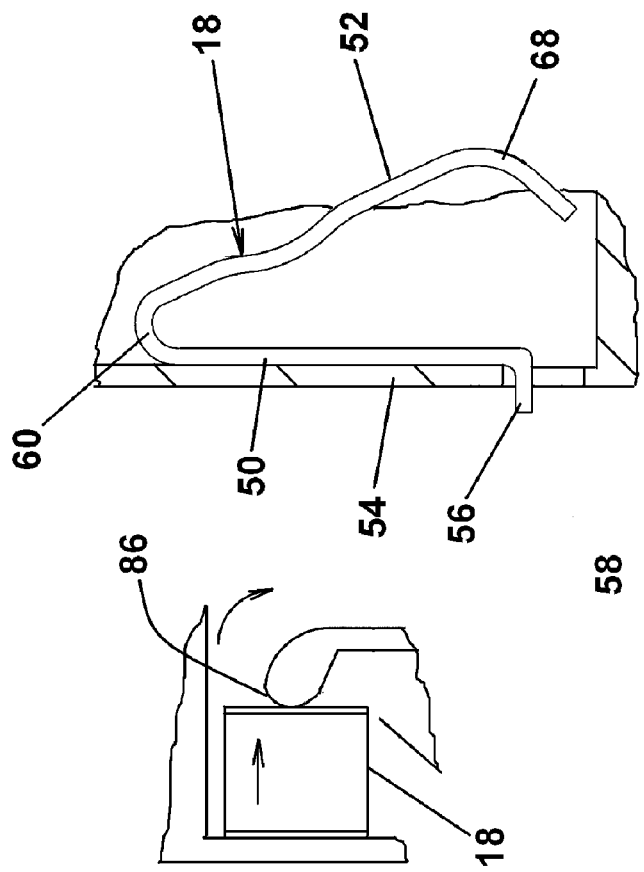
FIG. 17
FIG. 16
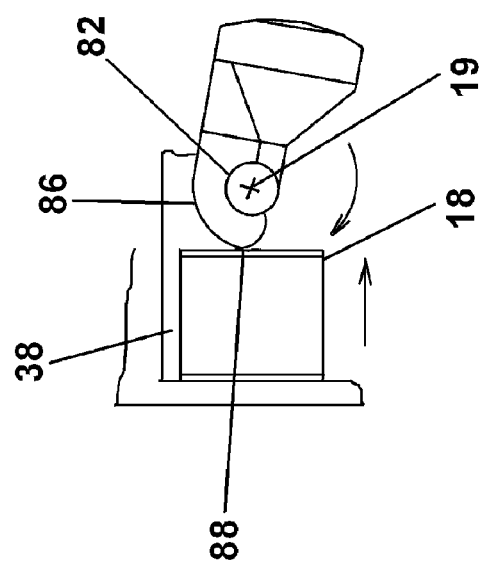
FIG. 15

UNIVERSAL OUTLET PLATE COVER ASSEMBLY

FIELD OF THE INVENTION

The present invention relates to cover plates for electrical boxes, and, in particular, a hinged lid for standard outlet cover plates.

BACKGROUND OF THE INVENTION

Electrical outlets are generally placed about the exterior of a residential home for enabling outdoor electrical service. Inasmuch as the outlets are exposed to weather conditions and adversely affected by moisture and contaminants, various covering devices have been used to weatherproof the electrical components. Where longer term connections are desired, hinged housings have been proposed wherein the weatherproofing is maintained when the outlet is in service. Examples of such approaches are disclosed in U.S. Pat. Nos. 6,028,268; 6,133,531; 3,813,640; D460,421; and D486,452. When continuous or extended term exterior service is required, dedicated in ground is commonly used as an alternative.

The majority of exterior residential uses are only temporary applications, such as seasonal lighting and power tool operation. Where electrical shorts may be experienced, electrical safety is readily provided by substituting a ground fault current interrupter (GFCI) for a conventional duplex receptacle. Weatherproofing for the receptacle is nonetheless desirable for ongoing protection, and hinged receptacle covers meeting applicable standards, such National Electric Code and/or the Underwriters Laboratory approvals, are widely available. While these covers provide generally satisfactory results, certain deficiencies are apparent. Many use a separate cover for each receptacle outlet. In others, such as disclosed in U.S. Pat. No. 4,381,063 a single side cover is provided. As the receptacle may be mounted in either a horizontal or vertical orientation, the covers can restrict the free downward and lateral routing the electrical cord. In order to provide convenient routing in both situations, side mount and top mount covers have been proposed. For instance, U.S. Pat. No. 5,763,831 discloses a universal cover plate having pairs of side and top hinge tabs that may be selectively used for the cover. The hinge tabs not required for the desired application are removed. The tabs and the cover project outwardly of the frontal profile of the cover plate and may not be compatible with recessed or limited access locations.

SUMMARY OF THE INVENTION

A weatherproof outlet plate cover assembly in accordance with the present invention provides a weatherproof a universal lid that is diagonally hinged at a corner of the cover plate for unobstructed lateral and downward routing of electrical cables in either a horizontal of vertical location. The universal lid carries a sealing gasket that is spring biased against a projecting rim that circumscribes a center panel provided with a center opening(s) for use with standard electrical devices, such as duplex or GFCI receptacles or electrical switches. In the open position, the lid is positioned within the frontal envelope of the cover plate allowing use in recessed and restricted access locations. The hinge design thus allows the use of one product of each configuration for two applications, i.e. vertical plus horizontal mounting. Moreover, the design may be may be utilized in multiple-gang configurations, either with a single cover or multiple hinge sets.

Accordingly, it is an object of the present invention to provide a cover plate assembly for outdoor standard receptacles that may be mounted in either a vertical or horizontal orientation without restricting access for electrical connection.

Another object of the invention is to provide a weatherproof outdoor assembly for use with standard receptacles with minimal structural variation.

A further object of the invention wherein a corner mounted cover provides a weatherproof closure for outdoor electrical receptacles.

DESCRIPTION OF THE DRAWINGS

The above and other features of the present invention will become apparent upon reading the following description of the preferred embodiments taken in conjunction with the accompanying drawings in which:

FIG. 4 is a front view of the duplex outlet plate for the assembly of FIG. 2;

FIG. 5 is a rear view of the outlet plate of FIG. 4;

FIG. 6 is a cross sectional view taken along line 6—6 in FIG. 4;

FIG. 7 is a cross sectional view taken along line 7—7 in FIG. 4;

FIG. 8 is an enlarged cross sectional view of the detail in FIG. 7;

FIG. 9 is a front view of the GFCI outlet plate for the assembly of FIG. 3;

FIG. 10 is a front view of the universal cover lid for the assemblies;

FIG. 11 is a rear view of the cover lid of FIG. 10;

FIG. 12 is to side view of the cover lid of FIG. 10;

FIG. 13 is an enlarged cross section view of the detail in FIG. 12;

FIG. 15 is a fragmentary cross sectional view of the cover lid for the assemblies of FIGS. 2 and 3 in the open position; and FIG. 16 is a fragmentary cross sectional view of the cover lid for the assemblies of FIGS. 2 and 3 in the closed position; and FIG. 17 is an enlarged fragmentary cross sectional view of the lid spring on the cover plate.

DETAILED DESCRIPTION OF THE PREFERRED EMBODIMENTS

Figure 1:
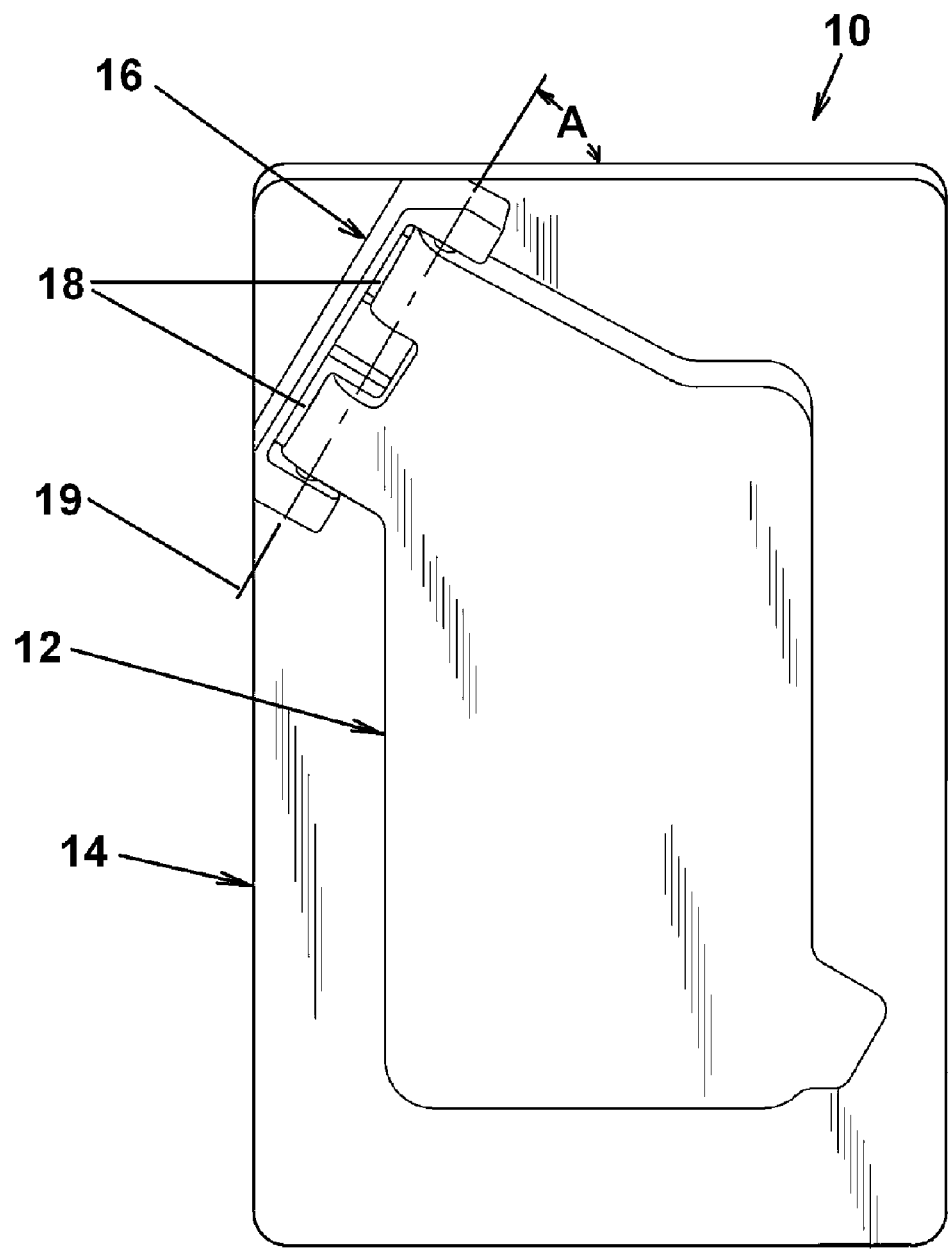
FIG. 1 is a front perspective view of a universal outlet plate cover assembly for an electrical outlet box in accordance with embodiments of the invention showing the cover in the closed position.
Figure 2:
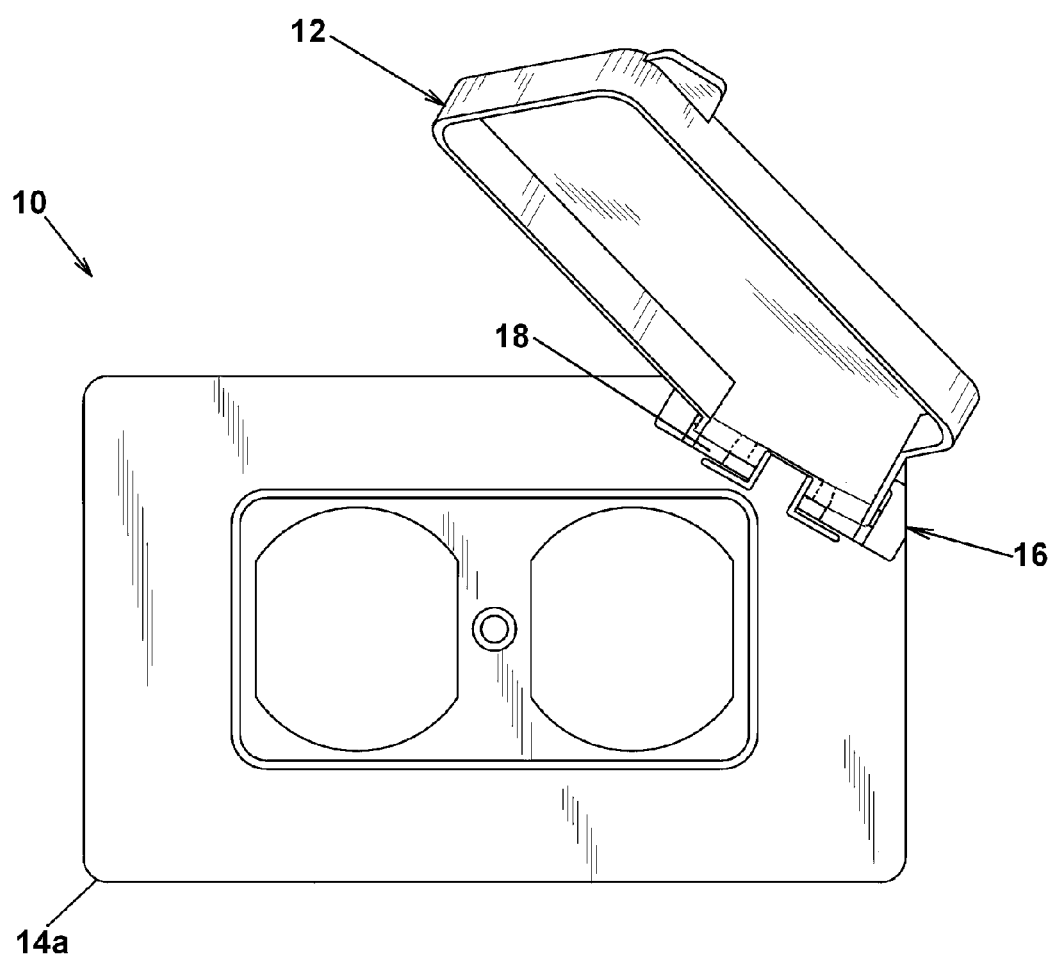
FIG. 2 is a front perspective view of the universal outlet plate cover assembly for a duplex receptacle oriented in a horizontal position and showing the cover lid in the open position.
Figure 3:
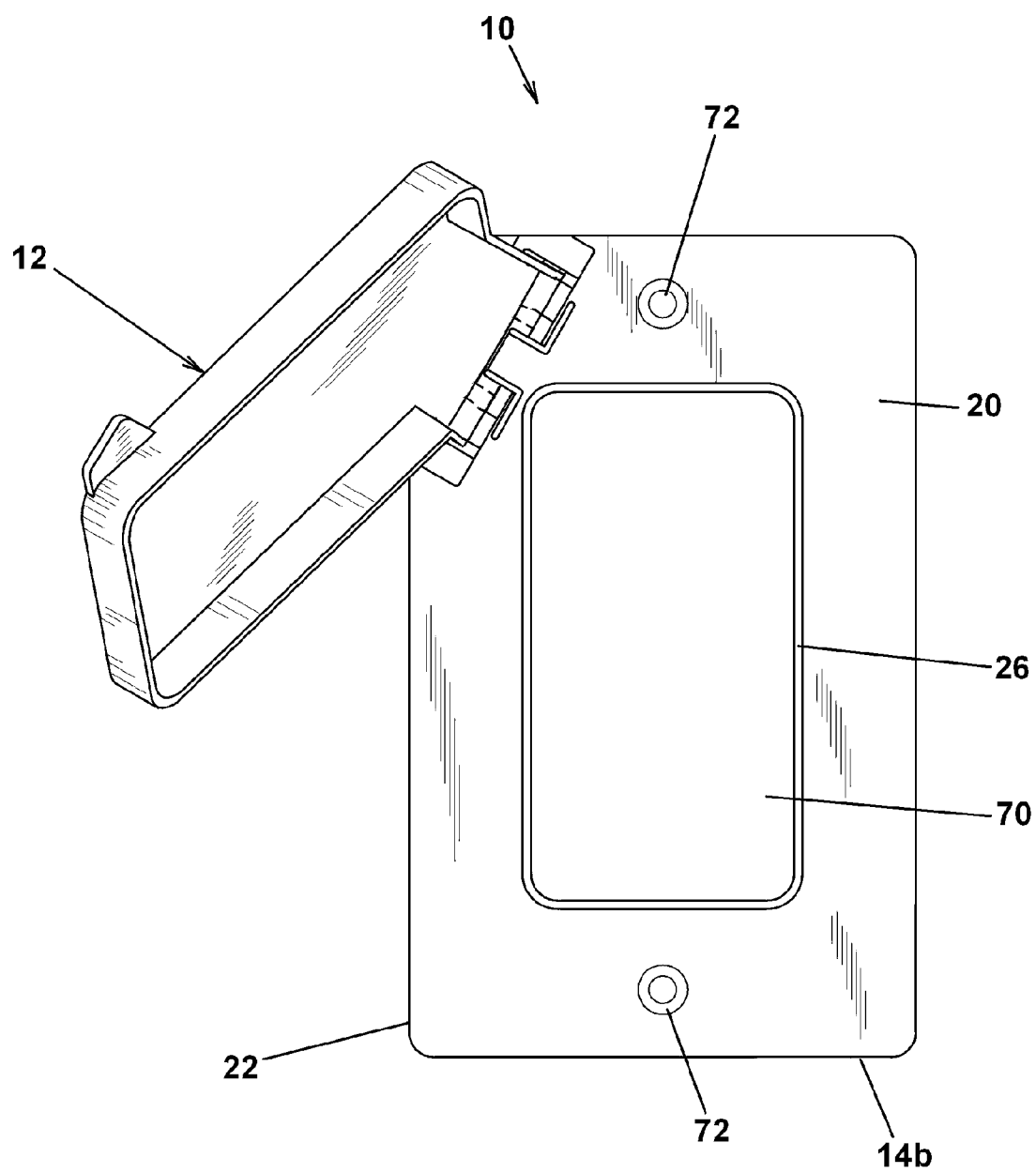
FIG. 3 is a front perspective view of a universal outlet plate cover assembly for a GFCI receptacle oriented in the vertical position and showing the cover lid in the open position.

Referring to FIG. 1, there is a universal outlet plate cover assembly 10 for electrical outlet boxes carrying standard receptacles prescribed by UL specifications, such a duplex, GFCI and toggle switches. The cover assembly comprises a cover lid 12 identical in both the duplex and GFCI configurations illustrated herein, and a cover plate 14 differing only in the openings for receiving and mounting on the receptacle. The cover plate 14 is of standard dimensions having laterally spaced long sides and longitudinally spaced short sides. FIG. 2 illustrates the duplex embodiment and shows the assembly in a horizontal mounting position of the long sides with the cover lid 12 in the open position with respect to the duplex cover plate 14*a*. FIG. 3 illustrates the GFCI embodiment and shows the assembly in a vertical mounting position of the long sides with cover lid in the closed position with the GFCI cover plate 14*b*. The cover lid 12 is pivotally supported on the cover plate 14 by a diagonal corner hinge assembly 16. The cover lid 12 is self biased by a pair of lid springs 18 to a closed position overlying and weatherproofing the associated receptacle. In the open operative position, the cover lid 12 is inclined with respect to the cover plate, within the frontal profile thereof. The axis 18 of the hinge assembly 16 is inclined at an angle "A" with respect to the top short wall of the cover plate, allowing full unrestricted access from two sides in both horizontal and vertical mounting orientations for establishing electrical connections. An angle of about 60° is preferred.

As discussed above, both cover plates are identical in structure differing only in the provisions for receptacle and mounting, and common identification will hereinafter be used with respect to common structure. Referring to FIGS. 4 through 8, the cover plate 14*a* for the duplex assembly is a one-piece molded plastic or cast metal part having a generally rectangular base 20 circumscribed by a peripheral rim 22 outwardly bounded by a downwardly curved lip 24 and inwardly bounded by a thin walled generally upwardly extending shoulder 26 the inner surface of which is configured to circumscribe the outer periphery of either a duplex or a GFCI receptacle. A planar panel 27 extends inwardly from the shoulder 26 and includes a pair of spaced duplex apertures 28 spaced by a cross band 30 having a countersunk opening 32. In assembly, the apertures are located and configured for receiving the duplex outlets and the opening receives a conventional mounting screw for attachment to the duplex receptacle. As described below, the panel 26 may be apertured for receiving a GFCI receptacle.

The corner hinge assembly 16 includes a hinge block 33 formed integrally diagonally across the upper left corner of the base 20. The hinge block 33 includes a pair of spaced upwardly extending hinge posts 34 interconnected by an upwardly extending stop wall 36. A pair of rectangular spring receiving recesses 38 are formed in the base 20 between the hinge posts 34 for receiving the cover lid springs 18 as shown in FIG. 17. As shown in FIG. 8, a downwardly extending and inwardly opening slot 40 in formed in each post 34 for receiving the hinge pins of the cover lid as described below for prescribing rotation about the hinge axis. The axis of rotation in the slots is along the axis 19. Upwardly extending reinforcing ribs are formed adjacent the recesses 38. As shown in FIG. 5, downwardly extending generally trapezoidal reinforcing ribs 44 are formed on the lower surface of the base adjacent the lateral ends. The ribs 44 engage the receptacle arms to increase the mounting stability of the assembly.

Figure 14:
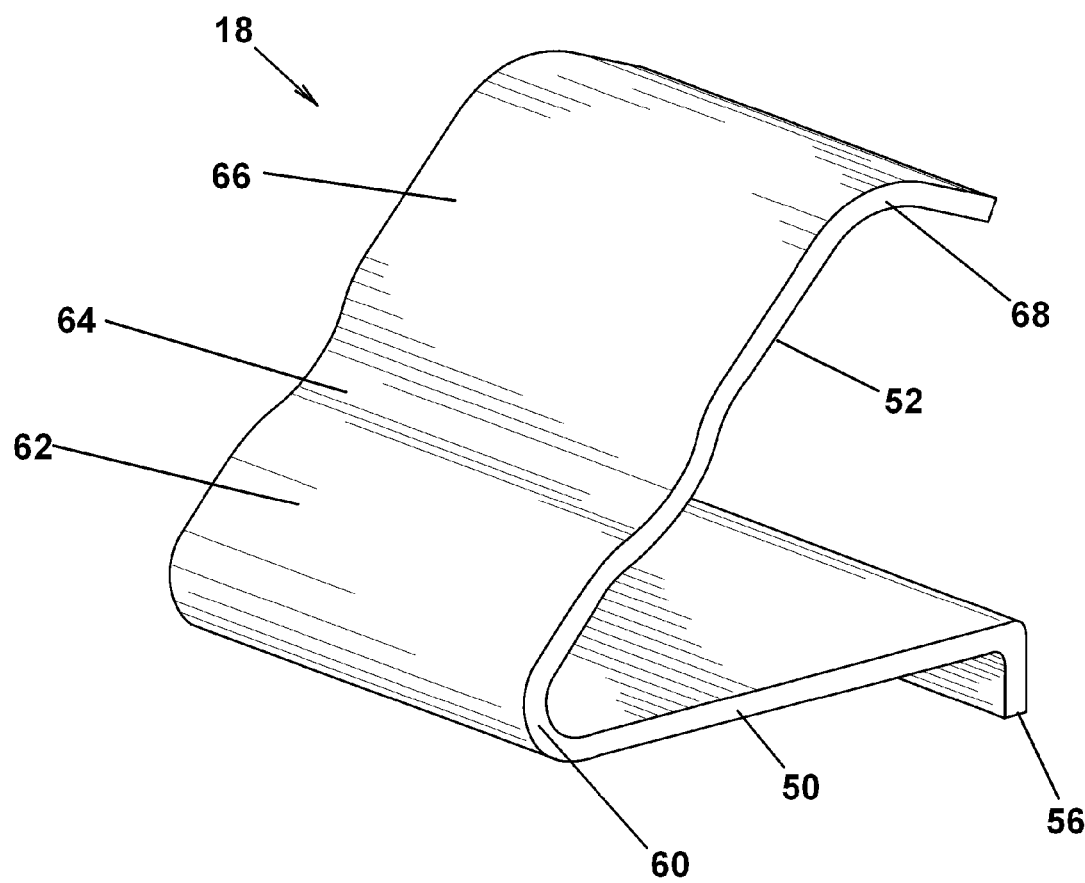
FIG. 14 is perspective view of the lid spring.

Referring to FIGS. 14 and 17, the springs 18 are formed of spring steel and comprise a planar base 50 and a deflectable spring arm 52. The base 50 that engages the bottom wall 54 of the recess and terminates at one end with a downwardly turned tab 56 that is located in a locating slot 58 with a curved end 60 merging with the lower end of the spring arm 52. The spring arm 52 includes a lower end 62, a reversely curved middle section 64, and an upper end 66 terminating with a reversely downwardly curved tip 68. In assembly as described below, the spring arm 52 is downwardly deflected to provide a self closing biasing force on the cover lid 12.

Referring to FIGS. 3 and 9, the GFCI cover plate 12*b* has an opening 70 in the panel 27 inwardly of the shoulder 26 to provide telescopic assembly with the GFIC receptacle and a pair of countersunk openings 72 for conventional assembly by mechanical fasteners to the mounting arms of the receptacle. In other respects, the cover plate 14*b* is structurally the same as cover plate 14*a*.

Referring to FIGS. 10 through 13, the cover lid 12 is a one-piece molded plastic or metal casting comprising a generally rectangular lid section 70 having a diagonally outwardly extending hinge arm 72 at one corner and a diagonally outwardly extending lift tab 74 at the opposed corner. The lid section 70 has a planar top wall merging with the top walls of the hinge arm 72 and lift tab 74. The cover lid 12 has a downwardly extending rim 76 about the lid section 72 outwardly circumscribing the shoulder 26 on the cover plates and forming a downwardly opening recess carrying a gasket 78 that sealingly engages the top surface of the shoulder 26 on the cover plate to form a weatherproof sealing interface in the closed position. The hinge arm 72 outwardly terminates with a pair of spaced fingers 80 carrying a pair of outwardly extending cylindrical hinge pins 82 aligned along axis 84. In assembly as shown in FIG. 8, the hinge pins 82 are rotatably journaled in the slots 40 in the hinge posts 34 for prescribing rotation of the cover lid about the assembly axis 19 between the open and closed positions. As shown in FIGS. 12 and 13, the hinge fingers 80 terminate with a curved cam surface 86 having an origin 88 beyond the axis. In assembly as shown in FIGS. 15 and 16, the cam surface 86 deflects the tips of the springs creating a torque in the closing directions, thereby providing self biasing from the open position It will thus be appreciated that the present invention provides an outlet plate cover assembly wherein a single diagonal corner hinge assembly between the cover lid and the cover plate provides wide access for cable routing in either a horizontal or vertical mounting a wherein a universal cover plate may be mounted on a universal cover plate, modified only at a central panel for accepting a standard receptacle selected from duplex or GFCI configurations.

For the other applications, such as switches, the center panel is appropriately apertured to receive the device. For use in multiple gang assemblies, the cover plate is provided with plural sets of openings for receiving the selected electrical devices and a single or multiple hinged cover lid(s) used for sealing the outlets and/or switches.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed is:

1. An outlet plate cover assembly for connection with a standard electrical receptacle selected from duplex or GFCI formats, said cover assembly comprising: a substantially rectangular base member having laterally spaced long sides and longitudinally spaced short sides for overlying said standard electrical receptacle in assembly; means for attaching said base member to said standard electrical receptacle; a projecting peripheral shoulder projecting from said base member and circumscribing said electrical receptacle; a center panel member on said base member inwardly of said shoulder; aperture means in said panel member for operatively receiving the standard electrical receptacle; a lid member having a peripheral rim defining a recess in assembly outwardly surrounding said shoulder; a gasket member carried in said recess in said lid member and sealingly engaging said shoulder in a closed position; hinge means diagonally disposed between a short side and a long side at a corner of said base member for pivotally connecting said lid member to said base member for movement about a diagonal axis between said closed position and an open position operatively exposing said standard electrical receptacle, said hinge means including a hinge bracket on said base member and an arm section on said lid member, said hinge bracket includes a pair of spaced end members interconnected by a projecting rear wall engaging and limiting said lid member to an open position substantially normal to said base member, said arm section extending diagonally from said rim and having a pair of spaced, axially aligned pin members, said hinge bracket projecting from said base member and extending diagonally at a corner thereof wherein said arm section terminates with a curved cam surface, said bracket including a pair of downwardly opening slots supporting said pin members for rotation about said axis; a recess between said slots in said bracket for receiving spring means; said spring means carried between said base member and said arm section for biasing said lid member to said closed position wherein said spring means includes a base section engaging the base of said recess and merging with an arm section terminating with a curved tip engaging said cam surface so as to provide said continuous biasing to said closed position.

2. The cover plate assembly as recited in claim 1 including a lifting tab extending from said lid member for assisting manual movement to said open position.

3. The cover plate assembly as recited in claim 1 wherein said diagonal axis is inclined about 60° from one of said short sides of said base member.

4. The cover plate assembly as recited in claim 2 wherein said aperture means includes a pair of openings for receiving the outlets of the duplex format.

5. The cover plate assembly as recited in claim 2 wherein said aperture means includes a single rectangular opening for receiving the outlet of the GFCI format.

6. An outlet plate assembly comprising: an electrical receptacle selected from duplex or GFCI formats, said outlet plate assembly comprising: a cover plate having substantially rectangular base member having laterally spaced long sides and longitudinally spaced short sides, said sides intersecting at peripheral corners; an opening in said base member for operatively receiving said electrical receptacle; means for attaching said base member to said standard electrical receptacle; a peripheral shoulder outwardly projecting from said base member and circumscribing said opening; a lid member having a diagonally extending arm section, said lid member and said arm section having a top wall having a downwardly depending peripheral rim defining a recess in assembly, said rim outwardly surrounding said shoulder and located inwardly of said sides of said cover plate; a lifting tab extending outwardly from said peripheral rim opposite said arm section; a gasket member carried in said recess in said lid member and engaging said shoulder in a closed position; a hinge bracket on said cover plate diagonally disposed between a short side and a long side interior of one of said corners and extending forwardly therefrom; means for pivotally connecting said arm section of said lid member to said base member for movement about a diagonal axis between said closed position and an open position operatively exposing said electrical receptacle; and spring means carried between said base member and said arm section for biasing said lid member to said closed position.

* * * * *

US007129413C1

(12) EX PARTE REEXAMINATION CERTIFICATE (7554th)
United States Patent
Rao et al.

(10) Number: US 7,129,413 C1
(45) Certificate Issued: Jun. 8, 2010

(54) UNIVERSAL OUTLET PLATE COVER ASSEMBLY

(75) Inventors: C. Gireesh Rao, Cary, NC (US); David L. Scheer, Raleigh, NC (US); Ashok Sathyanarayana Alilughatta, Kothrud Pune, IN (US)

(73) Assignee: Sigma Electric Manufacturing Corporation, Garner, NC (US)

Reexamination Request:
No. 90/009,383, Jan. 15, 2009

Reexamination Certificate for:
Patent No.: 7,129,413
Issued: Oct. 31, 2006
Appl. No.: 10/904,955
Filed: Dec. 7, 2004

(51) Int. Cl.
*H02G 3/14* (2006.01)

(52) U.S. Cl. .................. 174/66; 174/67; 220/241; 220/242

(58) Field of Classification Search .................. None
See application file for complete search history.

(56) References Cited

U.S. PATENT DOCUMENTS

| | | |
|---|---|---|
| 3,792,414 A | 2/1974 | Smith |
| 4,505,403 A | 3/1985 | Bowden, Jr. et al. |
| 5,430,253 A | 7/1995 | Pratt ........................... 174/67 |
| 6,133,531 A | 10/2000 | Hayduke et al. ............... 174/67 |
| 6,476,321 B1 | 11/2002 | Shotey et al. .................. 174/67 |
| 6,642,453 B2 | 11/2003 | Shotey et al. |
| 6,700,063 B2 | 3/2004 | Shotey et al. |
| 6,891,104 B2 | 5/2005 | Dinh |
| 6,979,777 B2 | 12/2005 | Marcou et al. |
| 7,071,414 B2 | 7/2006 | Kim |
| 7,071,415 B1 | 7/2006 | Shotey et al. |
| 7,119,277 B1 | 10/2006 | Shotey et al. |
| 7,304,238 B1 | 12/2007 | Shotey et al. |
| 7,598,453 B1 | 10/2009 | Shotey et al. |

FOREIGN PATENT DOCUMENTS

DE    29616804 U1    8/1997

OTHER PUBLICATIONS

German Patent No. 29616804 (U1); Publication Date: Aug. 21, 1997; Machine Translation; 10 pages.

*Primary Examiner*—Linh M. Nguyen

(57) ABSTRACT

A weatherproof outlet plate cover assembly provides a weatherproof a universal lid that is diagonally hinged at a corner of the cover plate for unobstructed lateral and downward routing of electrical cables in either a horizontal of vertical location. The universal lid carries a sealing gasket that is spring biased against a projecting rim that circumscribes a center panel provided with a center opening(s) for use with either duplex or GFCI receptacles. The hinge design allows the use of one product in each formal for two applications—vertical plus horizontal mounting.

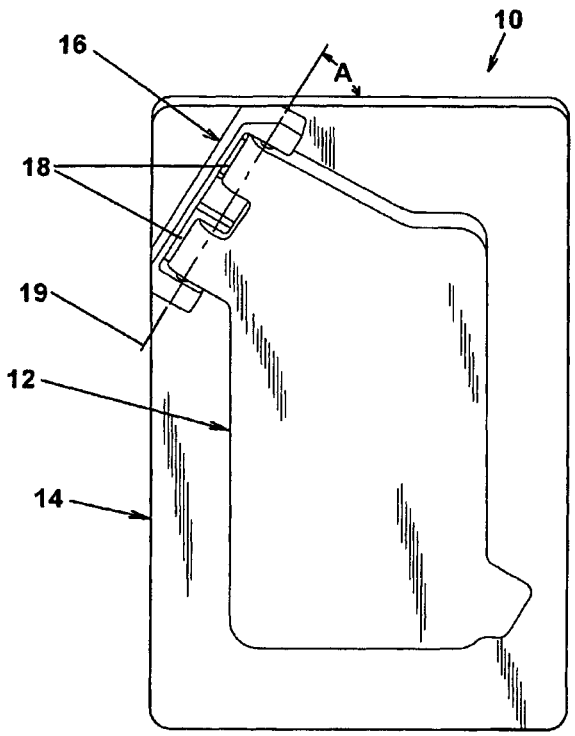

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6 is confirmed.

New claims 7 and 8 are added and determined to be patentable.

*7. The cover plate assembly as recited in claim 1, wherein the hinge means projects out from a surface of said base member.*

*8. The cover plate assembly as recited in claim 1, wherein the short side and the long side intersect to form a corner, and wherein the hinge bracket is disposed inward of said corner.*

* * * * *